United States Patent [19]

Thamerus

[11] 4,349,096
[45] Sep. 14, 1982

[54] APPARATUS FOR TEMPORARY STORAGE OF STACKED CIGARETTES OR THE LIKE

[75] Inventor: Theobald Thamerus, Hamburg, Fed. Rep. of Germany

[73] Assignee: Hauni-Werke Körber & Co. KG, Hamburg, Fed. Rep. of Germany

[21] Appl. No.: 172,061

[22] Filed: Jul. 24, 1980

[30] Foreign Application Priority Data

Jul. 25, 1979 [DE] Fed. Rep. of Germany ....... 2930096

[51] Int. Cl.³ .......................... B65G 37/00; B65G 1/16
[52] U.S. Cl. .................................... 198/347; 198/620; 198/778
[58] Field of Search ....................... 414/331, 403, 787; 198/347, 620, 657, 778

[56] References Cited

U.S. PATENT DOCUMENTS 4,254,858 3/1981 Seragnoli ............................ 198/347

FOREIGN PATENT DOCUMENTS 1957002 9/1970 Fed. Rep. of Germany .

Primary Examiner—Robert G. Sheridan
Attorney, Agent, or Firm—Kontler, Grimes & Battersby

[57] ABSTRACT

A first-in last-out reservoir system for storage of stacked cigarettes or filter rod sections has two coaxial helically convoluted walls which are rotatable about their common axis on grooved internal and external rolls and define a helical chamber with an opening for admission of successive increments of a stack of rod-shaped articles. The walls are elastically deformable and those portions of the walls which are adjacent to the opening are spaced apart at a distance exceeding the length of an article to permit unimpeded admission of articles into or evacuation of articles from the chamber. The articles are delivered to or removed from the opening by one reach of an endless belt conveyor which is tangential to the walls. The pitch of the walls is constant or nearly constant, and the walls are rotated by one or more shafts for the aforementioned grooved rolls. The inner rolls form a first group whose grooves receive parts of the inner marginal portions of the walls, and the outer rolls form a second group whose grooves receive parts of the outer marginal portions of the walls. The devices for retaining the articles in the chamber against movement relative to the walls may include elastic cushions which coat the surfaces of the walls, elongated strips, or elastic beads which engage the end portions of articles in the chamber.

17 Claims, 7 Drawing Figures

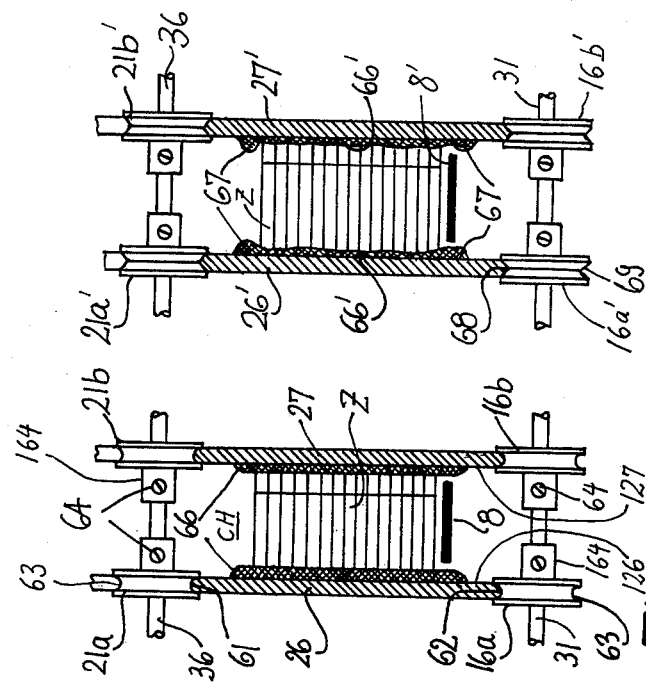
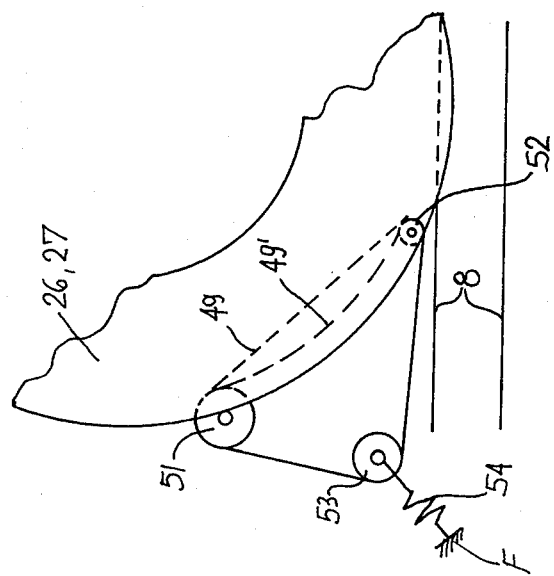

APPARATUS FOR TEMPORARY STORAGE OF STACKED CIGARETTES OR THE LIKE

BACKGROUND OF THE INVENTION

The present invention relates to apparatus for temporary storage of plain or filter tipped cigarettes, filter rod sections or analogous articles which constitute or form part of rod-shaped smokers' products. Such apparatus (also known as reservoir systems) are often used between one or more producing and one or more consuming or processing machines for temporary storage of rod-shaped articles when the output of the producing machine or machines exceeds the requirements of the processing machine or machines as well as for admission of articles to the processing machine or machines when the requirements of such machine or machines exceed the output of the producing machine or machines. Typical examples of producing machines which can supply articles to apparatus of the class to which the present invention pertains are machines for the making of filter rod sections or filter plugs which must be cured after they issue from the filter rod making machine or machines in order to allow for complete or sufficient setting of the customary plasticizing agent before the filter rod sections are introduced into the hopper of a filter tipping machine. It is also possible to employ such apparatus for temporary storage of plain or filter cigarettes prior to their admission into the magazine or hopper of a packing machine. Apparatus of the just outlined character are manufactured by the assignee of the present application and are known as Resy reservoir systems.

The provision of a reservoir system between one or more producing and one or more consuming or processing machines is becoming increasingly popular because the output of cigarette making, filter tipping, filter rod making and like producing machines is on the increase, practically from year to year. The output amounts to many thousands of rod-shaped articles per minute; therefore, substantial losses in output are incurred if the producing machine or machines must be arrested, even for very short intervals of time. Furthermore, many producing machines are constructed and assembled in such a way that the articles which are turned out immediately after resumption of the operation must be discarded in order to avoid entry of defective or potentially defective articles into the processing machine or machines. Analogously, losses in the output are very substantial when a processing machine must be arrested or must operate at less than maximum speed due to the failure of the producing machine or machines to deliver requisite quantities of rod-shaped articles. In such situations, the reservoir system supplements the temporarily reduced output of the producing machine or machines to thus ensure that the processing machine or machines can operate at full speed, at least for a certain interval of time which normally suffices to eliminate the cause or causes of malfunction of the producing machine or machines.

German Offenlegungsschrift No. 1,957,002 discloses a reservoir system which serves for temporary storage of cigarettes. A stack of cigarettes is loosely supported by a curved conveyor belt which forms loops and moves up and down about upright columns. A drawback of the just described conventional reservoir system is that the cigarettes are likely to change their positions, especially in the curves, so that they are often defaced, deformed or otherwise damaged. Moreover, the speed at which the conveyor can be driven is limited in order to avoid the just mentioned undesirable shifting of cigarettes which form the stack. The ends of the cigarettes are free to exchange moisture with the surrounding atmosphere. As a rule, such exchange of moisture leads to a reduction of the moisture content of tobacco at the ends of the cigarettes with the result that the dried particles of tobacco exhibit the tendency to escape and to contaminate certain components of the production line, namely, the reservoir system and/or the machine or machines which follow. Finally, the just discussed conventional reservoir system exhibits the drawback that its capacity is limited due to the fact that the conveyor is looped about upright columns. Thus, the maximum height of the reservoir system depends on the distance between the floor and the ceiling in the hall in which the reservoir system is installed.

OBJECTS AND SUMMARY OF THE INVENTION

An object of the invention is to provide an apparatus which can be used for temporary storage of large quantities of stacked rod-shaped articles in a small area.

Another object of the invention is to provide a first-in last-out or first-in first-out reservoir system which is surprisingly simple, which comprises a small number of parts, and which is sufficiently versatile to permit rapid conversion of its components for storage of longer or shorter rod-shaped articles.

A further object of the invention is to provide a reservoir system wherein the articles can be held against undesirable shifting or other movement relative to each other.

An additional object of the invention is to provide an apparatus which is capable of rapidly accepting or rapidly discharging large quantities of parallel rod-shaped articles and can be readily installed in existing production lines for the manufacture and/or processing of cigarettes, cigars, cigarillos or other rod-shaped articles which constitute or form part of smokers' products.

A further object of the invention is to provide novel and improved means for retaining rod-shaped articles in the interior of the reservoir of the above outlined apparatus.

An additional object of the invention is to provide the apparatus with novel and improved means for guiding the walls of its reservoir during admission of articles into, during storage of articles in or during evacuation of articles from the reservoir.

The invention resides in the provision of an apparatus for temporary storage of stacks or streams consisting of rod-shaped articles of predetermined length, particularly for temporary storage of plain or filter tipped cigarettes, filter rod sections or analogous articles which constitute or form part of rod-shaped smokers' products. The apparatus comprises a reservoir (such reservoir may be of the first-in last-out or of the first-in first-out type) including two coaxial helically convoluted walls which are rotatable about a common axis, which define a helical chamber arranged to store a stack of articles and having a width at least equal to the length of articles in the stack, and which have surfaces flanking the chamber and facing each other. The chamber is formed with at least one opening for admission of a stack of articles into the interior of the chamber in response to rotation of the walls about their common axis.

The apparatus further comprises guide means defining a path along which the helical walls move about their common axis at a predetermined pitch, and retaining means provided on the aforementioned surfaces of the two walls and serving to normally hold the articles of a stack in the chamber, at least against movement radially of and toward or away from the common axis of the walls. At least the major portions of the two walls are at parallel or substantially parallel to each other.

The apparatus further comprises means for rotating the two walls about their common axis. If the guide means comprises circumferentially grooved rollers or analogous rotary elements (the walls then comprise marginal portions which extend into the grooves of the rotary elements), the means for rotating may include at least one of the shafts for the rotary elements. The one shaft can receive torque from a suitable prime mover by way of a belt or chain transmission or the like. The opening preferably admits the stack into the chamber in such orientation that the longitudinal directions of the articles are parallel to the common axis of the two walls. The means for admitting articles into the chamber through the aforementioned opening may comprise a conveyor, e.g., an endless conveyor having an elongated portion or reach which is substantially tangential to the two walls. The same conveyor can evacuate (i.e., receive) articles from the chamber between the two helically convoluted walls. These walls are preferably flexible or elastically deformable so that the distance therebetween can be increased in the region of the opening in order to allow for unimpeded introduction of a stack of articles into or for unimpeded evacuation of a stack of articles from the chamber.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary and elevational view of the apparatus and of a guide in the region of the opening for admission of articles into the interior of the reservoir;

FIG. 4a is a sectional view as seen in the direction of arrows from the line IV—IV of FIG. 1;

FIG. 4b is a similar sectional view but showing a portion of a modified apparatus;

DESCRIPTION OF THE PREFERRED EMBODIMENTS

Figure 1:
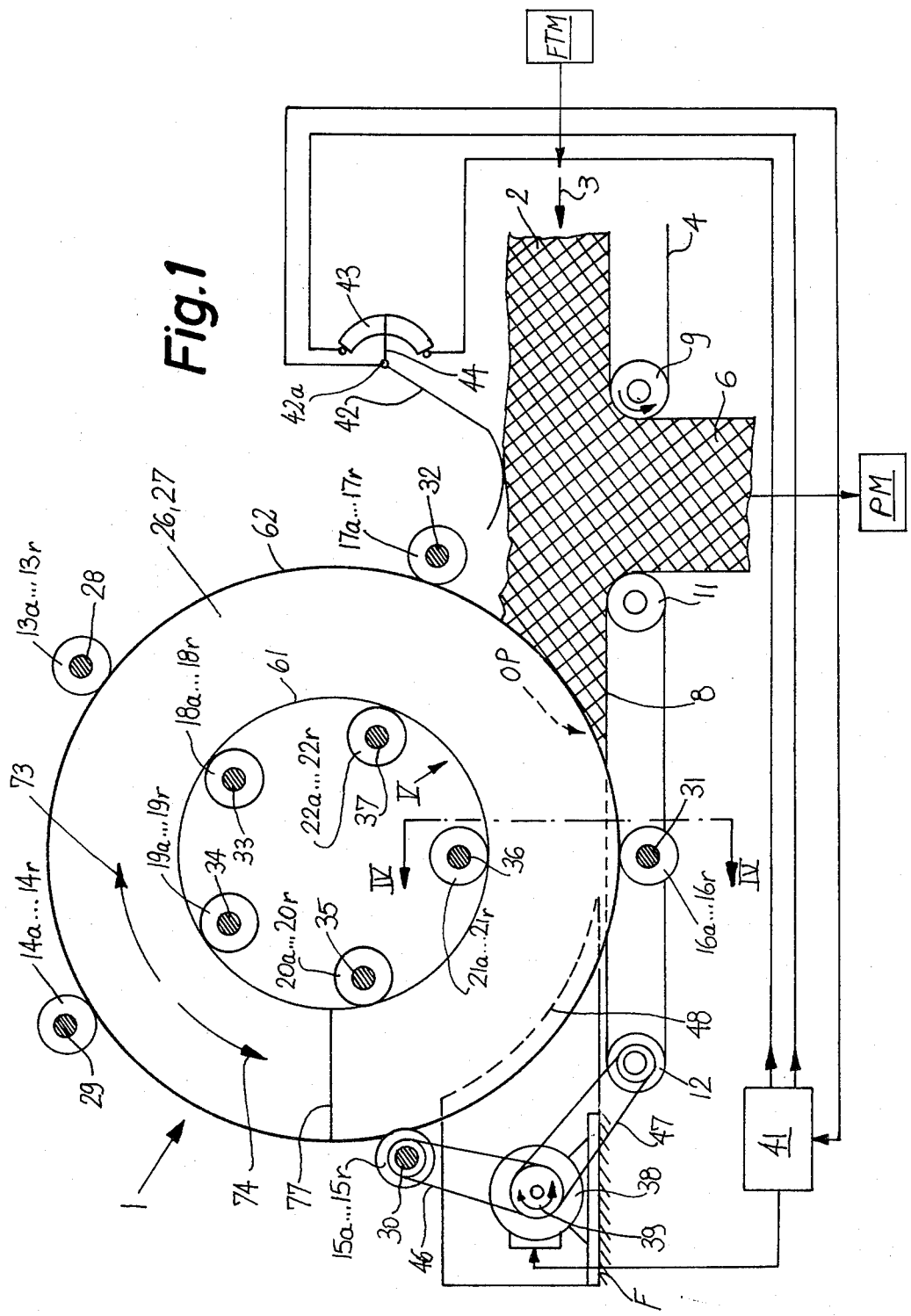
FIG. 1 is a schematic transverse vertical sectional view of an apparatus for temporary storage of filter rod sections or the like which embodies one form of the invention, the section being taken in the direction of arrows as seen from the line I—I of FIG. 2.
Figure 2:
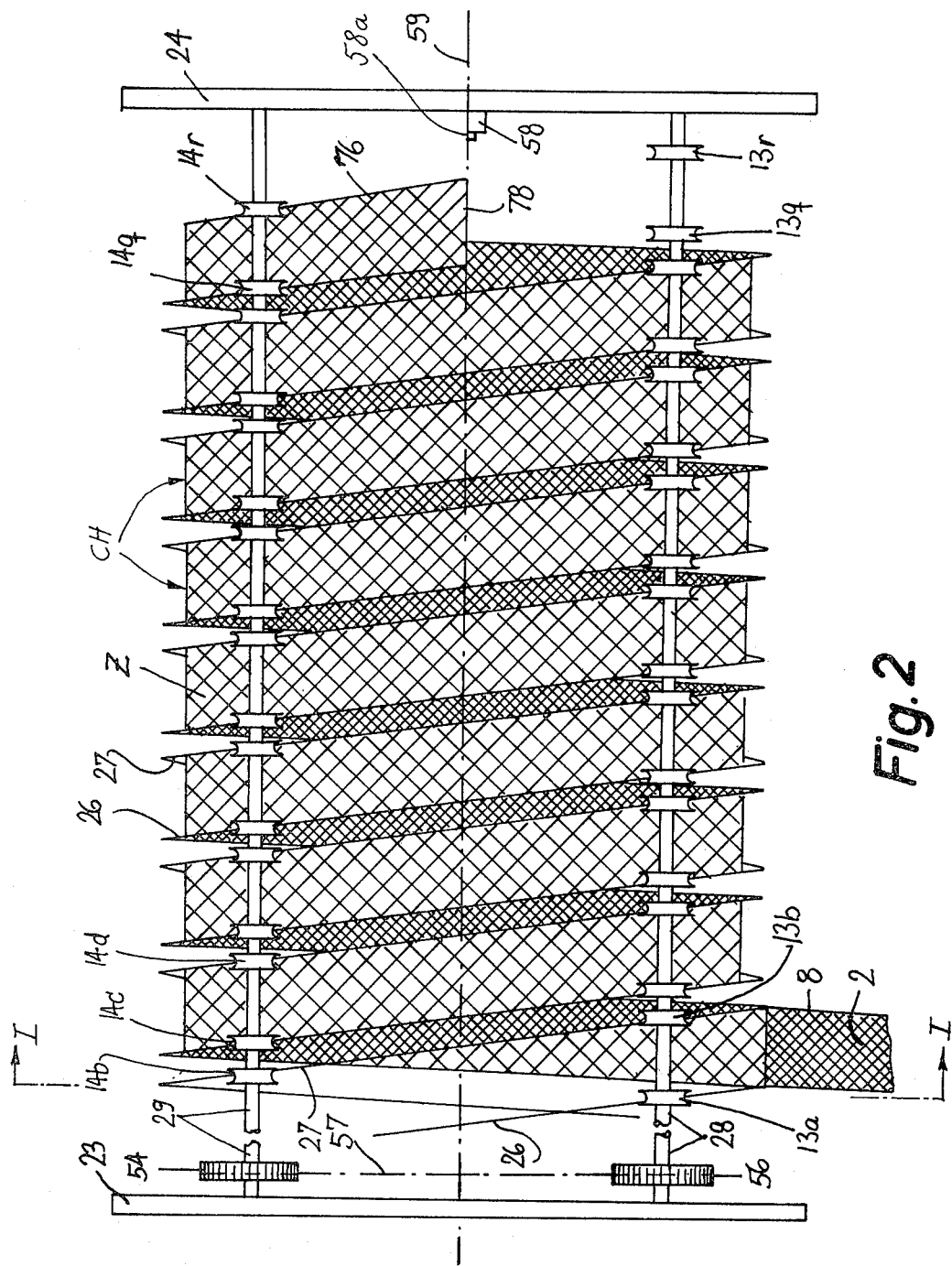
FIG. 2 is a schematic plan view of a portion of the apparatus which is shown in FIG. 1.

FIGS. 1 and 2 illustrate an apparatus for temporary storage of rod-shaped articles Z (FIGS. 4a and 5), e.g., filter cigarettes which are to be admitted into the hopper of a processing or consuming machine, e.g., a packing machine PM. The packing machine PM may be of the type known as COMPAS which is produced and sold by the assignee of the present application. The apparatus comprises a first-in last-out reservoir 1 having two helically convoluted walls 26 and 27 (the common horizontal axis 59 of these walls is indicated in FIG. 2 by a phantom line) which define a helical chamber CH for the storage of an elongated stack 2 of parallel articles Z. The articles Z are supplied by a producing machine FTM (e.g., a filter tipping machine of the type known as MAX S which is manufactured and sold by the assignee of the present application) which delivers a continuous stream or stack of parallel articles Z to the upper reach of an endless belt conveyor 4. The upper reach of this conveyor advances in the direction of the arrow 3, and the discharge end of the conveyor 4 delivers the leader of the stack or stream 2 into an upright or nearly upright duct 6 leading to the hopper of the packing machine PM.

A second endless belt conveyor 8 is disposed at the left-hand side of the duct 6, as viewed in FIG. 1, i.e., opposite the conveyor 4, and serves to deliver a stack or stream of articles Z from the conveyor 4 into the chamber CH or from the chamber CH into the duct 6. The arrangement is such that the conveyor 8 receives articles Z from the conveyor 4 when the duct 6 is full so that it cannot accept any additional articles or cannot receive all of the articles which are supplied by the conveyor 4. The conveyor 8 transports the articles Z from the chamber CH into the duct 6 when the requirements of the processing or consuming machine (i.e., of the packing machine PM) exceed the output of the producing (filter tipping) machine FTM, namely, when the machine PM requires a larger quantity of articles Z than supplied by the conveyor 4 or when the conveyor 4 fails to deliver any articles, e.g., owing to temporary malfunctioning of the machine FTM. The upper reach of the conveyor 8 is coplanar or nearly coplanar with the upper reach of the conveyor 4, and the conveyor 8 is driven by a reversible prime mover 38 so that its upper reach can travel in a direction to the right or to the left, as viewed in FIG. 1.

The conveyor 4 is trained over pulleys 9 of which only one is shown in FIG. 1. The conveyor 8 is trained over pulleys 11 and 12; the pulley 12 is driven by the prime mover 38 (e.g., a reversible electric motor) through the medium of a belt or chain transmission 47.

The aforementioned walls 26 and 27 of the reservoir 1 resemble the threads of a two-threaded feed screw without a core. The average distance between the walls 26 and 27, which are generally parallel to each other, equals B (see FIG. 5) which is equal to, slightly less or slightly greater than the length of an article Z. The walls 26 and 27 are rotatable about their common axis 59 (either clockwise or counterclockwise, as viewed in FIG. 1) at a constant pitch and are guided by two groups of rotary elements here shown as rolls having concave peripheral grooves 63 (see FIGS. 4a and 5) for the complementary inner and outer marginal portions 61 and 62 of the walls 26 and 27. The first or inner group of rotary elements includes sets of rolls 18a–18r, 19a–19r, 20a–20r, 21a–21r and 22a–22r. The peripheral grooves 63 of these rolls receive the inner marginal portions 61 of the walls 26 and 27. The second or outer groups of rotary elements includes sets of circumferentially or peripherally grooved rolls 13a–13r, 14a–14r, 15*a*-15*r*, 16*a*-16*r* and 17*a*-17*r*. The grooves 63 of these rolls receive and guide the outer marginal portions 62 of the walls 26 and 27. For the sake of simplicity, the rolls 13*a*-13*r* to 22*a*-22*r* will be referred to as rolls 13 to 22. The rolls 13 to 17 can be said to act not unlike an external nut which is held against axial movement and, therefore, causes the walls 26, 27 to move axially (in a direction to the right or to the left, as viewed in FIG. 2) when the walls are set in motion. The inner rolls 18 to 22 act not unlike a feed screw which is also held against axial movement and therefore causes the walls 26 and 27 to move axially when the walls are caused to rotate (clockwise or counterclockwise) about their common axis 59.

The rolls 13 to 22 are respectively mounted on shafts 28, 29, 30, 31, 32, 33, 34, 35, 36, 37. The axes of these shafts are rotatably mounted in the frame F (see the panels 23 and 24 shown in FIG. 2) of the apparatus. The shafts 28 to 37 are preferably mounted in such a way that they can rotate in the panels 23, 24. The rolls 13 to 22 are adjustably fixed to the corresponding shafts 28 to 37 by screws 64 (see FIG. 4*a*) or analogous fasteners. These screws are rotatable in the hubs 164 of the respective rolls and their tips can enter suitable notches in the peripheries of the respective shafts. The axial positions of the rolls 13 to 22 determine the pitch of the walls 26 and 27. FIG. 2 merely shows the shafts 28 and 29 for the rolls 13 and 14; the remaining rolls and their shafts have been omitted in FIG. 2 for the sake of clarity. The length of the shafts 28 to 37 is twice the length of the twin-threaded helix formed by the walls 26 and 27. Thus, the shafts 28 to 37 for the rolls 13 to 22 are longer than shown in FIG. 2 so as to enable the twin-threaded reservoir 1 to move axially to the left well beyond the position which is shown in FIG. 2 and also to the right, namely, to and slightly beyond the position of FIG. 2. Such axial movement of the walls 26 and 27 takes place in response to rotation about their common axis 59.

The means for rotating the walls 26 and 27 about the axis 59 comprises the aforementioned reversible prime mover 38 which can drive the shaft 30 for the rolls 15 clockwise or counterclockwise (see the double-headed arrow 39 in FIG. 1). The means for transmitting torque from the output element of the prime mover 38 to the shaft 30 (which, in turn, rotates the walls 26, 27 clockwise or counterclockwise, as viewed in FIG. 1) includes an endless belt or chain 46.

The means for regulating the operation of the prime mover 38 (i.e., for starting or arresting this prime mover as well as for determining the speed and the direction of rotary movement of its output element) comprises a thyristorized control circuit 41 of known design. For example, this circuit may be a circuit of the type known as Mini-Semi which is produced and sold by the firm AEG of Federal Republic Germany. The control circuit 41 receives signals from a sensor 42 which rests on the pile or articles Z at the top of the duct 6 (i.e., in the gap between the conveyors 4 and 8) and is pivotable about the axis of a shaft 42*a*. The sensor 42 controls the position of a wiper 44 forming part of a potentiometer 43 which is connected with the control circuit 41. The control circuit 41 with the sensor 42 can be replaced by other types of control means, for example, by a control unit with a sensor performing three functions including initiation of forward movement of the prime mover 38, rearward movement of this prime mover and stoppage of the prime mover. Such sensor would cooperate with a reversing relay which would be capable of changing the direction of rotation of the prime mover. The potentiometer 43 is designed in such a way that the position of its wiper 44 determines the RPM of the shaft 30 as well as the direction of rotation of this shaft, i.e., the RPM and the direction of rotation of the output element of the prime mover 38. The prime mover 38 is a three-phase electric motor.

It is further clear tht the prime mover 38 can transmit torque to two or more shafts. This is indicated in the left-hand portion of FIG. 2 wherein the shafts 28 and 29 respectively carry sprocket wheels 56 and 54. A chain 57, which is trained over the sprocket wheels 54 and 56, is driven by the prime mover 38 in a manner not shown in FIG. 2; this chain can be used as a substitute for the belt or chain 46 of FIG. 1 and, in addition to driving the shafts 28 and 29, can also transmit torque to the shaft 30 in a manner as shown in FIG. 1.

A stationary guide member 48, e.g., a suitably bent piece of sheet metal, extends into the chamber CH from the outside between the walls 26 and 27 in a portion of the chamber between the rolls 15 and 16. The purpose of the guide member 48 is to prevent escape of the articles Z which are admitted by the conveyor 8 into the chamber CH or which are about to leave the chamber CH (to be deposited on the upper reach of the conveyor 8) by way of an opening OP which is located between the rolls 16 and 17, as viewed in FIG. 1. The guide member 48 is stationary and is secured to the frame F of the apparatus, a portion of such frame (other than the aforementioned panels 23, 24) being shown in FIGS. 1 and 3.

FIG. 3 illustrates a modified guide member 49 which can be used as a substitute for the stationary guide member 48 of FIG. 1. This modified guide member 49 is an endless belt which is trained over rollers 51, 52 and 53. The roller 53 is attached to the frame F by a spring 54 or other suitable biasing means which serves to impart to the roller 53 the function of a tensioning member for the belt 49. When the belt portion between the rollers 51 and 52 is engaged by the outer layer of a stack of articles Z in the chamber CH between the walls 26 and 27, such belt portion is moved to the position 49' and the spring 54 causes the thus deformed belt portion to exert a certain pressure upon the articles Z of the adjacent portion of the supply of parallel articles which are stored in the reservoir. The roller 51, 52 and/or 53 need not be driven because the belt 49 moves in response to rotation of the walls 26, 27 about their common axis 59, i.e., in response to conversion of the originally straight stack or stream of articles on the upper reach of the conveyor 8 into a helically convoluted supply or stack in the chamber CH. When the walls 26, 27 are rotated in a direction to discharge articles Z onto the conveyor 8, the helically convoluted supply or stream is converted back into a straight stack or stream which is transported toward and admitted into the upper end portion of the duct 6 between the conveyors 4 and 6.

The panel 24 of the frame F is provided with an abutment 58 which serves to arrest the rightward progress of the reservoir 1 (walls 26 and 27), as viewed in FIG. 2. The abutment 58 ensures that the rear end of the chamber CH cannot advance beyond the conveyor 8 when the chamber CH is filled with articles Z. The abutment 58 is or can contain or carry a limit switch which serves to arrest the producing machine FTM when the reservoir 1 is filled with articles. The illustrated abutment 58 carries a limit switch 58*a* which is actuated by the right-hand end wall 78 of the reservoir 1 when the latter assumes its rightmost position, as viewed in FIG. 2. The other end wall of the reservoir 1 is shown at 77 (see FIG. 1). The limit switch 58a can further serve to arrest the prime mover 38 when it is engaged by the end wall 78 or by another part which shares the rightward movement of the reservoir 1, as viewed in FIG. 2, and strikes against the limit switch 58a when the chamber CH is filled with rod-shaped articles Z.

A similar abutment with a limit switch can be and preferably is provided on the panel 23 to terminate the leftward movement of the reservoir 1, as viewed in FIG. 2.

FIG. 4a illustrates one presently preferred form of retaining means for the articles Z which are admitted into the chamber CH between the walls 26 and 27. This Figure merely shows the lower portions of the walls 26, 27 in section between the rolls 16 and 21, i.e., in the region of the aforementioned opening OP for admission of articles Z into or for removal of articles from the chamber CH. The upper reach of the conveyor 8 is shown in FIG. 4a in section between the walls 26, 27, namely, between those sides or surfaces 126, 127 of the walls 26, 27 which face each other and flank the respective portion of the chamber CH. The retaining or holding means for the articles Z in the chamber CH are provided on the just mentioned sides or surfaces 126, 127 of the walls 26, 27 and comprise elastic cushions 66 which have a constant or nearly constant thickness and engage and hold the end faces of the articles Z of the stack or stream 2 in the chamber CH. The cushions 66 may consist of foam rubber, foamed synthetic plastic material which exhibits at least some elasticity, air-filled cushions or pads, or the like. It has been found that the retaining means can serve its purpose with particular advantage if it includes relatively thin layers of foamed synthetic plastic material which is highly elastic and whose exposed side is coated with a thin film of antistatic synthetic plastic material.

FIG. 4a further shows that the marginal portions 61 and 62 of the walls 26, 27 are convex so as to fit into the matching grooves 63 in the peripheral surfaces of the rolls 16 and 21. The hubs 164 of these rolls are rotatable on the respective shafts 31, 36 and are separably but adjustably affixed to such shafts by the aforementioned screws 64 or analogous fasteners. This renders it possible to change the pitch of the walls 26, 27 and/or to change the width of the chamber CH, either along the major part of the length of this chamber (if the reservoir 1 is to store articles which are longer or shorter than the illustrated articles Z) or only in a certain portion of the reservoir 1, namely, in that portion which defines the opening OP for admission of articles into or for removal of articles from the chamber CH.

The cushions 66 can be bonded or otherwise permanently or detachably secured to the respective sides or surfaces 126, 127 of the walls 26 and 27.

FIG. 4b illustrates a portion of a modified reservoir. The difference between this reservoir and the reservoir which embodies the structure of FIG. 1a is that the walls 26' and 27' carry modified retaining or holding means for the rod-shaped articles Z. The retaining means are elastic cushions 66' having thicker edge portions or beads 67 which are adjacent to the inner and outer marginal portions 68 of the walls 26' and 27'. The beads 67 are outwardly adjacent to the innermost and outermost layers of articles Z in the chamber between the walls 26', 27' to thus further reduce the likelihood of escape of articles radially inwardly toward the common axis of the two walls or radially of and away from such axis. The marginal portions 68 have a wedge-like profile; therefore, the rolls 16' and 21' on the shafts 31 and 36 of FIG. 4b have complementary circumferential grooves 69 which are bounded by pairs of frustoconical surfaces complementary to the adjacent facets of the marginal portions 68.

Figure 4C:
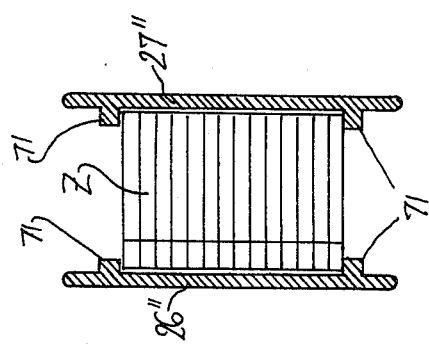
FIG. 4c is a similar sectional view but showing a portion of still another apparatus.

FIG. 4c illustrates a portion of another reservoir wherein the walls 26'', 27'' carry elongated strip-shaped retaining or holding means 71 for the rod-shaped articles Z in the chamber between the walls. An advantage of this embodiment of the improved apparatus is that the end faces of the articles Z need not be contacted at all because the retaining means 71 merely engage small parts of the end portions of wrappers of the articles Z. The distance between the walls 26'' and 27'' can slightly exceed the length of an article Z, as long as the distance between the facing pairs of retaining means or strips 71 is at least slightly less than the length of an article Z.

Figure 5:
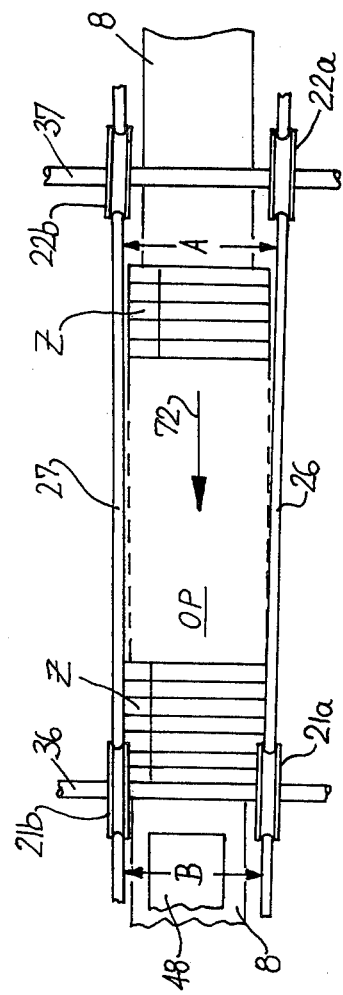
FIG. 5 is a schematic view of the region where the articles enter into or leave the reservoir, as seen from the interior of the reservoir.

FIG. 5 illustrates that portion of the reservoir 1 in the apparatus of FIGS. 1, 2 and 4a which is located in the region of the conveyor 8, i.e., in the region where the opening OP of the chamber CH admits articles Z into or permits evacuation of articles from the reservoir 1. The opening OP is located in the region between the common plane of the axes of the shafts 31, 36 (guide rolls 16 and 21) and the common plane of the axes of the shafts 32, 37 (rolls 17 and 22). The view of FIG. 5 is taken in the direction of arrow V which is shown in FIG. 1, i.e., the observer of the structure which is shown in FIG. 5 is assumed to be located in the space which is surrounded by the shafts 33 to 37 for the group of sets of inner rolls 18 to 22 and such observer is also assumed to be looking at the upper reach of the conveyor 8 from the space between the rolls 21, 22 toward and beyond the space between the rolls 16 and 17. The rolls 16 and 17 cannot be seen in FIG. 5; they are assumed to be respectively disposed behind the rolls 21 and 22. The stack of rod-shaped articles Z which can be seen in FIG. 5 is assumed to be supported by the upper reach of the conveyor 8.

The rolls 17, 22 spread the flexible or elastically deformable walls 26, 27 in the region of the opening OP to such an extent that the distance A between these walls (and more paticularly between the corresponding portions of the retaining means on the walls) is sufficient to allow for unimpeded admission of the stack into as well as for unimpeded evacuation of the stack from the chamber CH (it being assumed here that the reservoir 1 is a first-in last-out reservoir so that a single opening OP suffices for admission of articles into as well as for evacuation of articles from its interior). The distance between those portions of the walls 26, 27 which are guided by the rolls 16, 21 of FIG. 5 equals B, i.e., it is sufficiently small to ensure that the corresponding portions of the retaining means can safely hold the articles against escape from the chamber CH and preferably also against misalignment in the interior of the reservoir. The direction in which the articles Z advance from the upper reach of the conveyor 8 into the chamber CH is indicated by the arrow 72. Thus, the distance A between the wall portions which are guided by the rolls 17, 22 enables the articles Z to readily enter or leave the chamber CH. On the other hand, the articles Z in the chamber CH are safely retained as soon as they advance into the space between the rolls 16, 21 where the distance between the walls 26, 27 equals B. The walls 26 and 27 rotate during introduction of articles Z into or during evacuation of articles from the chamber CH. Introduction of articles Z into the chamber CH takes place when the conveyor 8 is driven to advance the stack of articles Z in the direction of the arrow 72 and the walls 26, 27 are rotated to advance toward the abutment 58 of FIG. 2. Evacuation of articles Z from the chamber CH is accomplished by the simple expedient of reversing the direction of movement of the upper reach of the conveyor 8 and by simultaneously changing the direction of rotation of the walls 26, 27 so that the end wall 78 moves away from the abutment 58, i.e., toward the panel 23 of the frame F.

It will be readily appreciated that the structure in the region of the opening OP can be modified in a number of ways without departing from the spirit of the invention. For example, the distance B which is shown in FIG. 5 need not be appreciably less than the distance A so that the wall portions in the region of the rolls 21 cannot, as yet, hold the articles Z against escape from the chamber CH. The distance between the walls 26, 27 then decreases further in a direction toward the rolls 15 and 20 and reaches the value B in the region of or even behind such rolls. This results in a lengthening of the region (opening OP) where the articles are admitted into or evacuated from the chamber CH. The guide member 48 or 49 is employed to ensure that the articles which have entered the chamber CH cannot leave the reservoir 1 except by way of the opening OP, i.e., in such a way that they come to rest on the upper reach of the conveyor 8.

It is further within the purview of the invention to stagger the inner rolls 18–22 with reference to the corresponding outer rolls 13–17, as considered in the circumferential direction of the walls 26 and 27. In other words, the common plane of the axes of the rolls 13 and 18 or 14 and 19 or 15 and 20, etc, may but need not include the common axis 59 of the walls 26 and 27. Such arrangement is shown in FIG. 1 but it is merely one of the presently preferred modes of distributing the two groups of guide rolls.

The operation of the apparatus is as follows:

The producing machine FTM delivers a continuous single-layer or multi-layer stream of rod-shaped articles Z to the upper reach of the conveyor 4 whereon the articles Z form a stack 2 moving in the direction of the arrow 3 shown in FIG. 1. The leader of the stack 2 on the upper reach of the conveyor 4 normally descends into the duct 6 and advances into the hopper of the processing machine PM. In the event of malfunction of the processing machine PM, i.e., if the rate at which the machine PM accepts articles Z from the duct 6 decreases or is reduced to zero but the producing machine FTM continues to deliver articles at the normal rate, the articles Z begin to pile up in the region below the sensor 42 which pivots clockwise, as viewed in FIG. 1, and causes the potentiometer 43 to transmit a signal to the corresponding input of the control circuit 41 so that the latter starts the prime mover 38 in a direction to drive the walls 26, 27 clockwise (see the arrow 73 in FIG. 1) and to drive the upper reach of the conveyor 8 in a direction to the left, i.e., from the upper end of the duct 6 toward the opening OP of the chamber CH between the walls 26 and 27. The control circuit 41 is preferably designed in such a way that the acceleration of the prime mover 38 from zero speed is gradual. Thus, instead of descending into the duct 6, the leader of the stack 2 on the conveyor 4 advances across the upper end of the duct 6 and onto the upper reach of the conveyor 8. The leader of the stack 2 then enters the chamber CH via opening OP in the region where the rolls 17 and 22 maintain the walls 26, 27 at the distance A so that the cushions or padding of retaining means on the walls 26 and 27 cannot interfere with the admission of articles into the chamber CH. The width of the chamber CH decreases in a direction toward or beyond the rolls 16, 21 so that the end portions of the articles Z are engaged by the cushions 66 and cannot escape toward the axis 59 of the walls 26, 27 or radially outwardly of and away from such axis as the walls 26 and 27 continue to rotate in the direction of the arrow 73 so that the front end wall 78 of the reservoir 1 advances toward the limit switch 58a on the abutment 58. The speed of the prime mover 38 is regulated by the sensor 42, i.e., the speed increases when the sensor 42 rises and vice versa. This guarantees that the height of the stack 2 which is transferred from the conveyor 4 onto the conveyor 8 and thence into the chamber CH is at least nearly constant.

The just described admission of articles Z into the chamber CH proceeds until the entire chamber is filled or as long as the malfunction of the processing machine PM persists. FIG. 2 illustrates the reservoir 1 in an axial position in which the chamber CH is nearly filled, i.e., the end wall 78 is very close to the limit switch 58a on the abutment 58 of the panel 24. The foremost convolutions or flights 76 of the walls 26 and 27 are closely adjacent to the panel 24. The producing machine FTM is arrested in automatic response to actuation of the limit switch 58a by the end wall 78 or by any other part of the reservoir 1 (or a part which moves in synchronism with the reservoir and reaches the switch 58a when the reservoir reaches the right-hand end of its path, as viewed in FIG. 2).

When the packing or processing machine PM is restarted or again begins to accept articles Z at the normal (maximum) rate, the leader of the stack 2 on the upper reach of the conveyor 4 again descends into the duct 6 and advances into the hopper of the machine PM. Thus, the position of the sensor 42 changes (the sensor descends to a predetermined position) so that the signal from the potentiometer 43 to the control circuit 41 denotes that the prime mover 38 should be arrested. Such predetermined position (in which the prime mover 38 is idle) is the normal or standard position of the sensor 42.

If the producing machine FTM is out of commission or begins to deliver articles Z at less than normal rate, the rate at which the conveyor 4 delivers articles to the duct 6 decreases and the sensor 42 descends to a position below the aforementioned predetermined or normal position. The potentiometer 43 then transmits a signal which causes the control circuit 41 to gradually start the prime mover 38 in reverse so that the walls 26 and 27 begin to rotate in the direction which is indicated by the arrow 74 of FIG. 1. The upper reach of the conveyor 8 then moves in a direction to the right, as viewed in FIG. 1, and the chamber CH delivers articles Z to and through the opening OP and onto the conveyor 8 which delivers the articles into the upper end portion of the duct 6. The speed at which the prime mover 38 drives the walls 26, 27 and the conveyor 8 is dependent on the position of the sensor 42 so that the conveyor 8 receives a stack of articles Z at a substantially constant rate. The prime mover 38 is arrested again when the sensor 42 rises sufficiently to assume its normal or predetermined position, i.e., when the producing machine FTM again delivers articles Z at the normal rate which can match or closely approximate the rate at which the machine PM normally accepts articles from the duct 6.

The control circuit 41 can be readily designed in such a way that the reservoir 1 is only partially empty before the prime mover 38 comes to a full stop so that the reservoir can immediately admit articles into the duct 6 when the conveyor 4 ceases to deliver articles at the normal rate.

The improved apparatus is susceptible of many additional modifications. Thus, and as already mentioned above, the reservoir 1 can be designed as a first-in first-out (through-flow) reservoir. In such apparatus, the chamber CH has two discrete openings one of which serves for admission of articles into the reservoir and the other of which admits articles onto a take-off conveyor. The latter is then a discrete conveyor, i.e., the conveyor 8 then serves soley for the admission of articles into the chamber CH (or vice versa). Furthermore, the reservoir 1 or an analogous reservoir can be installed at a level below the conveyor 8 so that the latter delivers articles into an upper portion of the chamber, namely, a portion of the chamber which is located at a level above the axis 59. Such modifications will be readily understood without additional illustrations upon perusal of the preceding description and the attached drawings.

As stated above, the walls 26 and 27 together resemble or constitute a modified feed screw with one or two threads and without a core. The outer diameter of the reservoir 1 is preferably large so that the chamber CH can store large quantities (several layers) of rod-shaped articles even if the axial length of the reservoir is not substantial. The same holds true for the inner diameter of the reservoir.

The walls 26 and 27 may but need not consist of metallic sheet material. For example, the walls may be made of a suitable synthetic plastic material which exhibits sufficient flexibility or elasticity to repeatedly undergo flexure in the region of the opening or openings OP so as to allow for unimpeded admission of articles Z into as well as for unimpeded evacuation of articles Z from the chamber CH whereas the cushions 66 or analogous retaining means safely hold the articles in the other (major) portion of the chamber CH.

The feature that the common axis 59 of the walls 26 and 27 is parallel or nearly parallel to the longitudinal directions of the articles Z in the chamber CH and on the conveyor 8 is desirable but optional. Such arrangement guarantees that the articles Z (which are delivered or removed by moving sideways, i.e., at right angles to their longitudinal directions) are treated gently and that the admission of articles into as well as the evacuation of articles from the chamber CH can be effected in a simple way and the region of admission or evacuation of articles occupies little room. As mentioned above, the upper reach of the conveyor 8 is tangential or nearly tangential to the reservoir 1 (this is clearly shown in FIG. 1) to further simplify the admission of articles into or the evacuation of articles from the chamber CH. FIGS. 4a, 4b and 5 show that the width of the conveyor 8 or 8' is less than the distance between the walls 26, 27 or 26', 27' in the region of the respective opening so as to enable the upper reach of the conveyor 8 or 8' to enter the space between the corresponding walls and to thus guarantee orderly admission of articles into or orderly withdrawal of articles from the chamber.

The provision of elastically deformable and preferably soft retaining means (such as those shown in FIGS. 4a and 4b) is desirable and advantageous if the axial length of certain articles Z deviates from a standard length. As a rule, the deviations are minimal so that relatively thin cushions 66 or 66' suffice to guarantee adequate retention of articles Z in the interior of the respective reservoir. The modification of FIG. 4c is desirable and advantageous when the nature of the articles is such that their end faces should not be contacted by the retaining means. As mentioned above, the distance between the walls 26", 27" of FIG. 4c is preferably greater than the standard length of an article Z. The articles are then held solely by the strips 71 which are adjacent to the inner as well as to the outer marginal portions of the respective walls so that the articles of the supply in the chamber cannot escape by advancing toward the common axis of the walls or by moving radially of the walls and away from such common axis.

If the reservoir of the improved apparatus constitutes a flow-through (first-in first-out) reservoir, it is especially suited for temporary storage of filter rod sections which require a certain period of time for setting of the plasticizer in their fillers. The purpose of the plasticizer (e.g., triacetin) is to bond portions of neighboring filaments of the fibrous filler in a filter rod section so that the filaments establish a large number of circuitous paths for the flow of tobacco smoke through the filter. Such plasticizer requires a certain interval of time to set so that a filter rod section which has issued from a filter rod making machine must be stored or otherwise kept away from the filter tipping machine for a given period of time in order to allow for adequate hardening of the plasticizer which is applied in liquid state (normally in the form of minute droplets which are sprayed against one or both sides of a banded running tow of filamentary filter material).

An important advantage of the improved apparatus is that the articles which enter the reservoir, which are temporarily stored in the reservoir or which issue from the reservoir are treated gently. Furthermore, the articles cannot be shifted relative to each other during admission into, during temporary storage in or during evacuation from the chamber of the reservoir. Still further, the apparatus can be readily adjusted so as to be capable of accepting relatively long, average or relatively short articles which constitute or form part of rod-shaped smokers' products. Finally, the apparatus is surprisingly compact and can be installed in existing production lines because the common axis of the two helical walls can be horizontal, vertical or inclined with reference to a horizontal or vertical plane.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for temporary storage of stacks consisting of rod-shaped articles of predetermined length, particularly for temporary storage of multi-layer streams consisting of cigarettes, filter rod sections or analogous articles which constitute or form part of rod-shaped smokers' products, comprising a reservoir including two coaxial helically convoluted walls rotatable about a common axis and defining a helical chamber arranged to store a stack of articles and having a width which at least equals said predetermined length, said walls having surfaces which flank said chamber and face each other and said chamber further having an opening for admission of a stack of articles into its interior in response to rotation of said walls about said common axis; guide means defining a path along which said walls can move about said common axis at a predetermined pitch; and retaining means provided on at least one of said surfaces of said walls and arranged to normally hold the articles of the stack in said chamber against movement relative to said walls.

2. The apparatus of claim 1, wherein at least the major portions of said walls are substantially parallel to each other.

3. The apparatus of claim 1, further comprising means for rotating said walls about said common axis.

4. The apparatus of claim 3, wherein said guide means comprises rotary elements at least some of which have circumferential grooves and said walls include marginal portions extending into said grooves.

5. The apparatus of claim 4, wherein said rotary elements have shafts and said means for rotating includes means for transmitting torque to at least one of said shafts, the rotary element on said one shaft being arranged to transmit torque to said portions of said walls.

6. The apparatus of claim 1, wherein said opening is arranged to admit the stack into said chamber in such orientation that the longitudinal directions of the articles in said chamber are substantially parallel to said common axis.

7. The apparatus of claim 1, further comprising conveyor means in register with said opening, means for supplying a stack of articles to said conveyor means, and means for driving said conveyor means in a direction to advance the thus supplied stack into said chamber via said opening.

8. The apparatus of claim 7, wherein said conveyor means includes an elongated portion which is substantially tangential to said walls.

9. The apparatus of claim 7, wherein said guide means includes components arranged to maintain the distance between said walls in the region of said opening at a value which exceeds said predetermined length so as to permit entry of articles into said chamber via said opening.

10. The apparatus of claim 1, wherein said retaining means comprises devices for holding the articles of the stack in said chamber in the region of the end portions of such articles.

11. The apparatus of claim 1, wherein said retaining means comprises elastic cushions.

12. The apparatus of claim 1, wherein said retaining means comprises beaded portions remote from said common axis and constituting abutments against movement of articles from said chamber in a direction radially of and toward or away from said common axis.

13. The apparatus of claim 12, wherein said retaining means are elastic cushions.

14. The apparatus of claim 1, wherein said retaining means comprises elongated supporting strips for the articles in said chamber.

15. The apparatus of claim 1, wherein said reservoir is a first-in last-out reservoir and further comprising conveyor means operable to deliver articles to or to receive articles from said opening.

16. The apparatus of claim 1, wherein said common axis is substantially horizontal.

17. The apparatus of claim 1, wherein said walls have inner and outer marginal portions and said guide means includes a first and a second group of rotary elements having peripheral surfaces respectively engaging said inner and said outer marginal portions.

* * * * *